(12) United States Patent
Lee et al.

(10) Patent No.: US 8,089,990 B2
(45) Date of Patent: Jan. 3, 2012

(54) APPARATUS AND METHOD FOR PREVENTING DATA READ ERROR FOR ORTHOGONAL FREQUENCY DIVISION MULTIPLEXING SYMBOL DEMODULATION

(75) Inventors: Hwang-Soo Lee, Daejeon (KR);
Moo-Hong Lee, Daejeon (KR);
Jeong-Han Jeong, Daejeon (KR);
Young-Serk Shim, Seoul (KR);
Byung-Jik Keum, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 188 days.

(21) Appl. No.: 12/233,084

(22) Filed: Sep. 18, 2008

(65) Prior Publication Data
US 2009/0303867 A1 Dec. 10, 2009

(30) Foreign Application Priority Data
Sep. 18, 2007 (KR) .................. 10-2007-0094496

(51) Int. Cl.
*H04J 3/06* (2006.01)
(52) U.S. Cl. ....................... 370/503; 370/516
(58) Field of Classification Search ............ None
See application file for complete search history.

(56) References Cited

U.S. PATENT DOCUMENTS

| | | | | |
|---|---|---|---|---|
| 6,009,131 A * | 12/1999 | Hiramatsu | ............... | 375/354 |
| 6,459,679 B1 * | 10/2002 | Kim | ............... | 370/208 |
| 6,731,622 B1 * | 5/2004 | Frank et al. | ............... | 370/342 |
| 6,748,026 B1 * | 6/2004 | Murakami et al. | ............... | 375/316 |
| 6,912,233 B2 * | 6/2005 | Spruyt et al. | ............... | 370/482 |
| 7,324,432 B1 * | 1/2008 | Kim | ............... | 370/208 |
| 2004/0184551 A1 * | 9/2004 | Liu et al. | ............... | 375/260 |
| 2006/0007895 A1 * | 1/2006 | Coralli et al. | ............... | 370/335 |
| 2009/0003493 A1 * | 1/2009 | Gunturi et al. | ............... | 375/344 |

OTHER PUBLICATIONS

Tracking of time misalignments for OFDM systems in multipath fading channels Garcia, M.J.F.-G.; Paez-Borrallo, J.M.; Consumer Electronics, IEEE Transactions on vol. 48 , Issue: 4 Publication Year: 2002 , pp. 982-989.*
Korean Intellectual Property Office—KIPO—search and opinion report dated May 13, 2008.*

* cited by examiner

*Primary Examiner* — Xavier Szewai Wong
(74) *Attorney, Agent, or Firm* — The Belles Group, P.C.

(57) ABSTRACT

Disclosed are an apparatus and a method for preventing data read error for OFDM symbol demodulation. An average time synchronization offset estimating unit estimates average time synchronization offset between a pilot symbol of a time synchronized data frame and pilot symbols of data frames next to the time synchronized data frame. A data buffer control unit acquires a start location of a data frame to be read using the estimated average time synchronization offset, and controls reading of written data frames using the acquired start location information of the data frame to be read. In the apparatus and the method, a data buffering using a ring buffer construction may compensate time synchronization offset of samples containing real data in an OFDM symbol and prevent an erroneous read error in order to improve a receiving performance of a receiver.

15 Claims, 5 Drawing Sheets

PRIOR ART

APPARATUS AND METHOD FOR PREVENTING DATA READ ERROR FOR ORTHOGONAL FREQUENCY DIVISION MULTIPLEXING SYMBOL DEMODULATION

This Nonprovisional application claims priority under 35 U.S.C. §119(a) to Korean Patent Application No. 10-2007-0094496, filed Sep. 18, 2007, the entire contents of which are hereby incorporated by reference.

BACKGROUND OF THE INVENTION

1. Field of the Invention

The present invention relates to an apparatus and a method for preventing data read error for orthogonal frequency division multiplexing (OFDM) symbol demodulation.

2. Description of the Related Art

FIG. 1 is a block diagram illustrating a transmitter of a conventional OFDM communication system.

Referring to FIG. 1, the transmitter of a conventional OFDM communication system includes an audio or video source 110, an audio/video (A/V) encoder 120, a transmission modem 130, a radio frequency (RF) unit 140, and a transmission antenna 150. The audio or video source 110 generates signals. The A/V encoder 120 performs source coding for the generated signals from the audio or video source 110. The transmission modem 130 performs OFDM modulation and channel coding to be tolerant of signal distortion in a wireless space. The RF unit 140 performs frequency conversion and signal amplification to readily transmit signals. The transmission antenna 150 efficiently transmits a signal over a radio space.

FIG. 2 is a block diagram illustrating a receiver of the conventional OFDM communication system.

With reference to FIG. 2, the receiver of the conventional OFDM communication system includes a receiving antenna 210, an RF unit 220, an analog/digital (A/D) converter 230, a receiving modem 240, an A/V decoder 250, and an audio/video player 260. The receiving antenna 210 efficiently receives a transmitted RF signal. The RF unit low-noise amplifies the RF signal and converts the frequency of the signal. The A/D converter 230 converts an analog signal into a digital signal so that a modem processes signals. The receiving modem 240 performs signal processing such as OFDM demodulation and channel decoding. The A/V decoder 250 performs source decoding for an audio or video signal. The audio/video player 260 plays the decoded audio or video signal.

In a fixed communication environment or a mobile communication environment in which a location of a terminal is changed, what greatly influences receiving performance of a receiver using OFDM is a frequency offset and accuracy of time synchronization. Accordingly, there is frequency and time synchronization arrangement for a receiving modem construction for OFDM.

FIG. 3 is a block diagram illustrating a receiving modem shown in FIG. 2.

Referring to FIG. 3, a data buffer 2401 stores an input signal for each frame. A data frame time synchronization unit 2402 acquires approximate time synchronization of the input signal using stored data. An integer frequency synchronization unit 2403 acquires integer frequency synchronization using the time synchronized signal. Next, a symbol time synchronization unit 2404 acquires accurate time synchronization in a ±½ sample. A time synchronization compensating unit 2406 acquires time synchronization of a phase reference signal in the next coming data frame using the acquired time synchronization. There after, an output signal of the time synchronization compensating unit 2406 is input to an I & Q demodulator 2407. An output signal of the integer frequency synchronization unit 2403 is input to a fractional frequency synchronization unit 2405. The fractional frequency synchronization unit 2405 is operated every OFDM symbol in order to compensate input carrier frequency variation due to the Doppler effect occurring in an environment of a mobile receiver and irregular frequency variation occurring due to the short stability of a reference oscillator frequency of a receiver A I&Q demodulator 2407 divides each OFDA symbol into an I signal and a Q signal to compensate a desired frequency offset for incoming data. Signals with compensated offsets are then demodulated by an OFDM demodulator 2409 and decoded by a channel decoder 2410.

It is very important to design a system arrangement to process continuously input RF data in real time in an OFDM communication system. So as to process the continuous input RF data, the processing time for a data frame is required to be shorter than a length of the data frame. Accordingly, a double buffer shown in FIG. 4 and a data buffer having a construction of a ring buffer 420 shown in FIG. 5 may be used for real time processing of input data to the receiver.

With reference to FIG. 4, the double buffer firstly stores input data to a buffer element 1 310, and the modem then processes previously stored data from the buffer element 1 310 while the double buffer stores next data therein to the buffer element 2 320. A usable memory space is limited in the double buffer because data buffering is performed on a fixed-size buffer element basis. Moreover, the double buffer may deteriorate a performance of the receiver when a starting part of a data frame is changed through the influence of time synchronization offset.

Referring to FIG. 5, since a construction of the ring buffer 420 uses one continuous buffer space, there is no restriction of a location to be read and stored in the buffer space. Accordingly, it is easier to compensate time synchronization in the ring buffer 420 structure than in the double buffer. While reading necessary data for a demodulation procedure, there may be an error of storing new data or of reading data that were not completely written. In order to prevent the occurrence of such an error, a data write processor 410 writes data in the ring buffer 420, and increases a write pointer W by the length of the written data. A data read processor 430 uses a ring buffer management method, which reads the data, and increases a read point R by the length of the read data. Further, the data write processor 410 and the data read processor 430 manages to return the increased write point and read point to original positions using a loop counter L. Consequently, when the data write processor 410 writes the data in a memory or the date read processor 430 reads the data from the memory, a writable space, a readable space, and an error state may be checked through the relation between the write point, the read point, and the loop counter. Upon reading of necessary data from the ring buffer 420, an erroneous data read error may be checked. However, time synchronization offset occurring due to the reference clock difference between a transmitter and a receiver may not be compensated. As a result, since a memory space reading data for OFDM symbol demodulation overlaps with a memory space for writing data, the erroneous data read error occurs.

SUMMARY OF THE INVENTION

The present invention has been made in view of the above problems, and it is an object of the present invention to provide an apparatus and a method for preventing an erroneous read error for input data and for improving a receiving performance and the reliability by compensating time synchronization offset due to the reference clock frequency difference between a transmitter and a receiver.

In accordance with an exemplary embodiment of the present invention, there is provided an apparatus for preventing data read error for orthogonal frequency division multiplexing (OFDM) symbol demodulation, comprising: an average time synchronization offset estimating unit estimating average time synchronization offset between a pilot symbol of a time synchronized data frame and pilot symbols of data frames next to the time synchronized data frame; and a data buffer control unit acquiring a start location of a data frame to be read using the estimated average time synchronization offset, and controlling reading of written data frames using the acquired start location information of the data frame to be read.

Preferably, wherein the average time synchronization offset is estimated by Equation, $$\Delta t_F = \frac{N}{2\pi k} \tan^{-1}\left(\frac{Y_{i+F}(k)}{Y_i(k)}\right) \quad \text{Equation}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F OFDM symbols, which is a k-th frequency component of a Discrete Fourier Transform value, and N is the number of total sample points included in one OFDM symbol.

More preferably, the average time synchronization offset is estimated by repeatedly applying a plurality of incoming pilot symbols in succeeding data frames next to the time synchronized data frame to the Equation.

Most preferably, the apparatus further comprises a radio channel effect compensating unit compensating radio channel effect included in the pilot symbol of the first time synchronized data frame and the pilot symbols of the succeeding data frames.

The data buffer control unit controls the reading of written data frames using a data pointer indicating a start location of the data frame to be read.

The apparatus further comprises a reference clock frequency difference calculating unit calculating a reference clock frequency difference between a transmitter and a receiver using the estimated average time synchronization offset from the average time synchronization offset estimating unit, and a time synchronization offset compensating unit compensating time synchronization offset of OFDM symbols using the calculated reference clock difference and the estimated average time synchronization offset.

In accordance with another aspect of the present invention, there is provided a method for preventing data read error for OFDM symbol demodulation, comprising: estimating average time synchronization offset between a pilot symbol of a time synchronized data frame in which the radio channel effect is compensated and pilot symbols of succeeding data frames next to the time synchronized data frame; and acquiring a start location of a data frame to be read using the estimated average time synchronization offset, and controlling reading of written data frames using the acquired start location information of the data frame to be read.

Preferably, the average time synchronization offset is estimated by Equation:

$$\Delta t_F = \frac{N}{2\pi k} \tan^{-1}\left(\frac{Y_{i+F}(k)}{Y_i(k)}\right) \quad \text{Equation}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F OFDM symbols, which is a k-th frequency component of a Discrete Fourier Transform value, an N is the number of total sample points included in one OFDM symbol.

More preferably, the average time synchronization offset is estimated by repeatedly applying a plurality of incoming pilot symbols in succeeding data frames next to the time synchronized data frame to the Equation.

Most preferably, the method further comprises compensating radio channel effect included in the pilot symbol of the first time synchronized data frame and the pilot symbols of the succeeding data frames before the estimation of average time synchronization offset.

The reading of written data frames is controlled using a data pointer indicating a start location of the data frame to be read.

The method further comprises calculating a reference clock frequency difference between a transmitter and a receiver using the estimated average time synchronization offset, and compensating time synchronization offset of an OFDM symbol using the calculated reference clock difference and the estimated average time synchronization offset.

The time synchronization offset is preferably compensated in units of OFDM symbols, OFDM symbol groups, or data frames.

In the apparatus and the method for preventing data read error for OFDM symbol demodulation according to the present invention, a data buffering scheme 6400 using a ring buffer construction may compensate time synchronization offset of samples containing real data in an OFDM symbol and prevent an erroneous data read error, to improve a receiving performance of a receiver.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
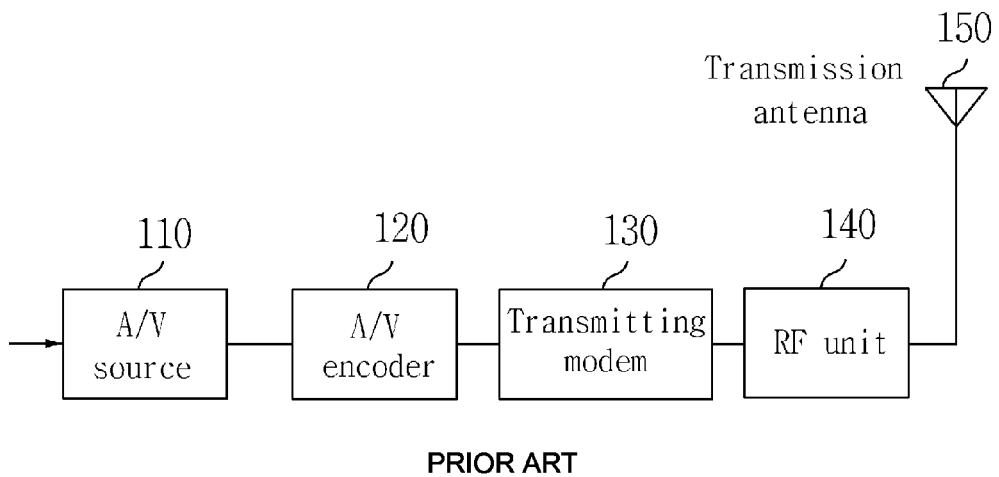
FIG. 1 is a block diagram illustrating a transmitter of a conventional OFDM communication system.
Figure 2:
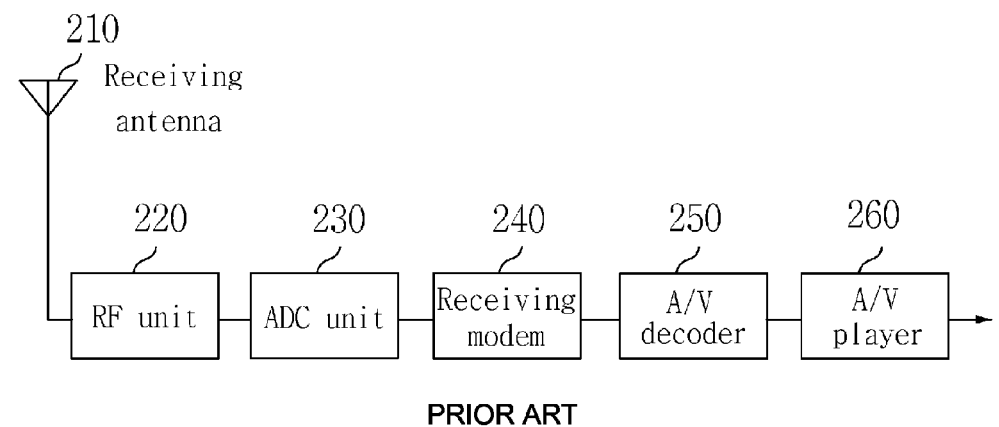
FIG. 2 is a block diagram illustrating a receiver of the conventional OFDM communication system.
Figure 3:
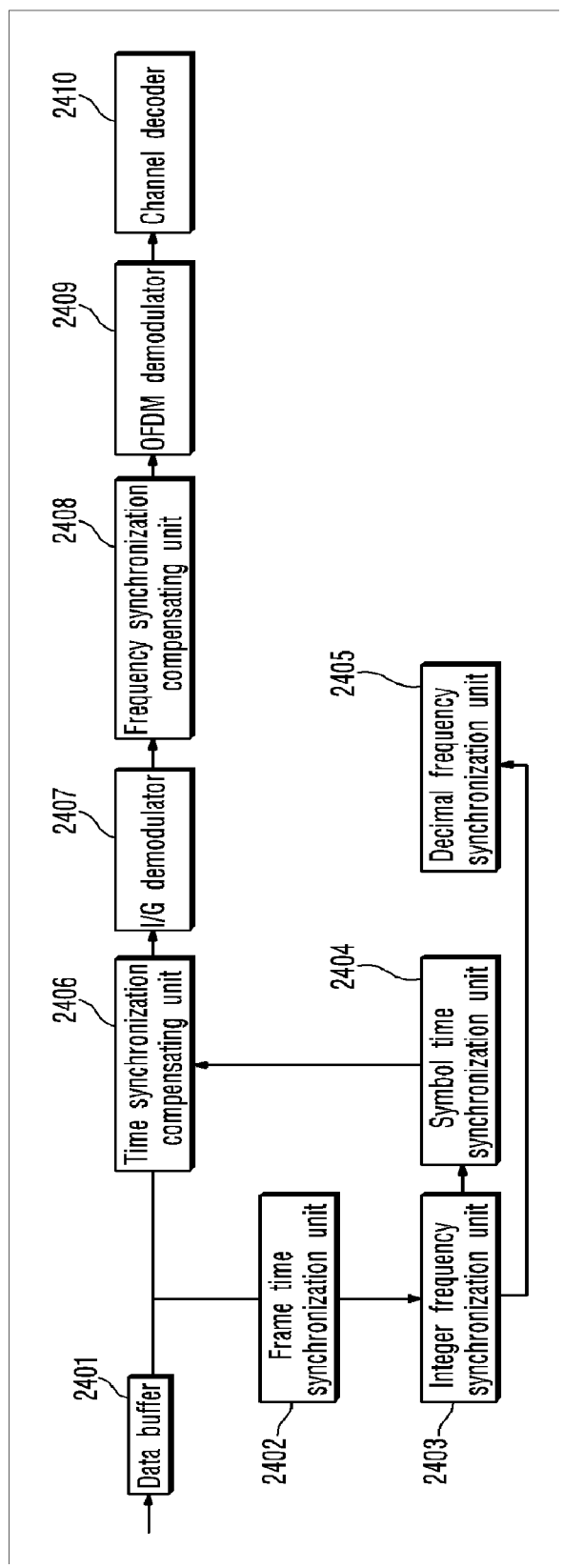
FIG. 3 is a block diagram illustrating a receiving modem shown in FIG. 2.
Figure 4:
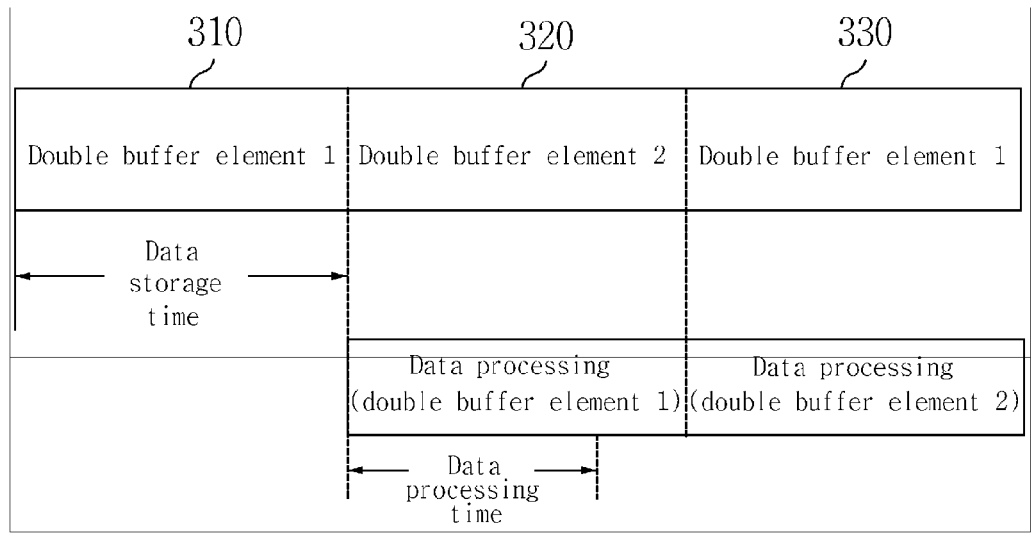
FIG. 4 and FIG. 5 are views illustrating a double buffer and a ring buffer used in a data buffer shown.
Figure 5:
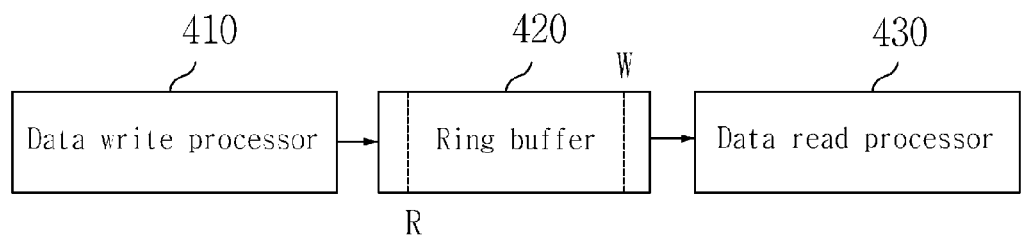

Hereinafter, exemplary embodiments of the present invention are described in detail with reference to the accompanying drawings. The same reference numerals are used throughout the drawings to refer to the same or like parts. Detailed descriptions of well-known functions and structures incorporated herein may be omitted to avoid obscuring the subject matter of the present invention.

Figure 6:
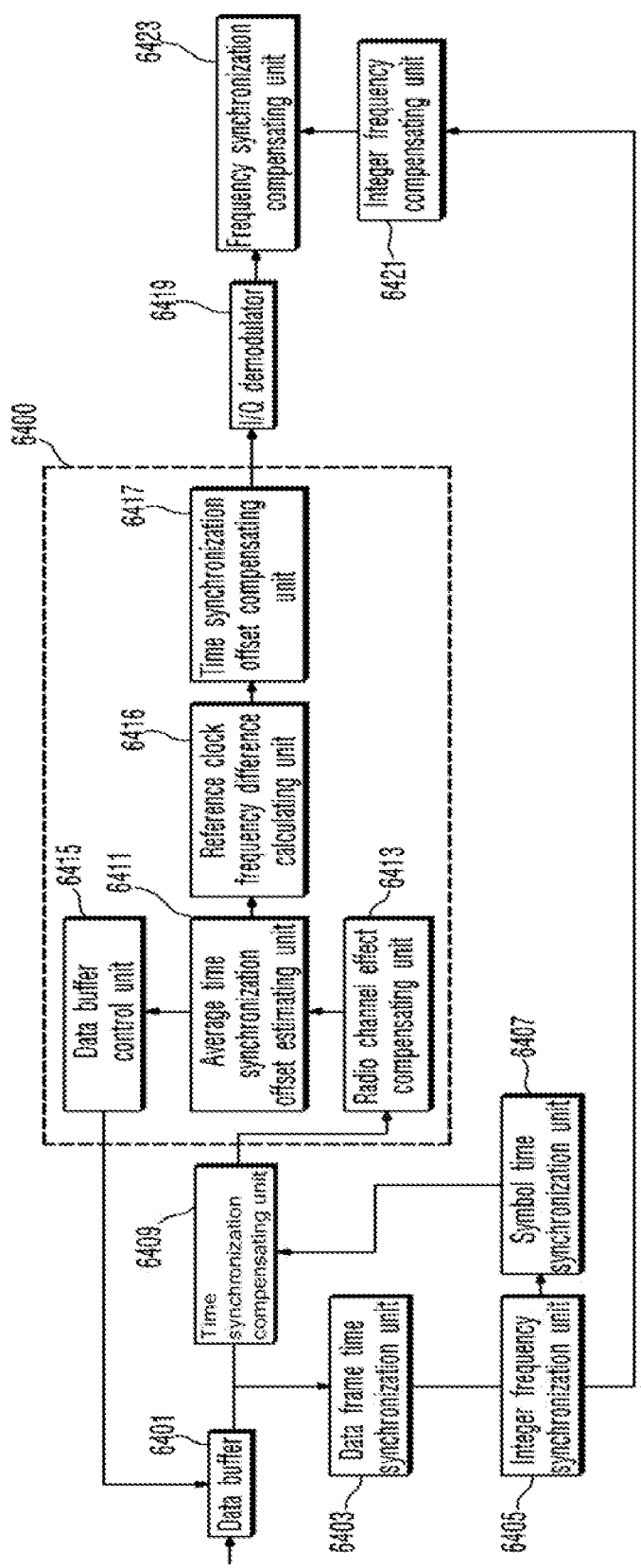
FIG. 6 is a block diagram illustrating an apparatus for preventing a data read error for OFDM symbol demodulation in accordance with an embodiment of the present invention.

FIG. 6 is a block diagram illustrating an apparatus for preventing a data read error for OFDM symbol demodulation in accordance with an embodiment of the present invention.

Referring to FIG. 6, data input through a receiving modem of a receiver are written in a data buffer 6401 in units of frames. A data frame time synchronization unit 6403, integer frequency synchronization unit 6405, and a symbol time synchronization unit 6407 acquire accurate time synchronization in a ±½ sample using the written data. A time synchronization compensating unit 6409 acquires time synchronization of a pilot signal in a next incoming data frame using acquired time synchronization information. Namely, the time synchronization compensating unit 6409 finds out a location of the pilot signal included in the next incoming data frame. Due to the reference clock frequency difference between the transmitter and the receiver, as time goes by, time synchronization offset occurs and the magnitude thereof is increased. Such a phenomenon causes the occurrence of a data read error of the data buffer 6401, resulting in deterioration in a receiving performance of the receiving modem. Accordingly, as shown in FIG. 6, an apparatus 6400 for preventing a data read error estimates time synchronization offset and compensates time synchronization offset of sample values constituting an OFDM symbol containing real data using the estimated time synchronization offset.

In an embodiment of the present invention, a terrestrial digital multimedia broadcasting (T-DMB) receiver is described by way of example among receivers of an OFDM modulation communication system transmitting a pilot symbol. In a case of the terrestrial DMB system, a basic unit of transmission is a frame having a length of 96 ms. One data frame is composed of a null symbol located in a start part and 76 OFDM symbols A pilot symbol per data frame for time synchronization corresponds to a phase reference symbol as an OFDM symbol. Accordingly, in a case of T-DMB, the phase reference symbol may be used to estimate or compensate channels and to acquire time synchronization of the receiver.

Hereinafter, the apparatus for preventing a data read error for OFDM symbol demodulation in accordance with the embodiment of the present invention will be described in detail.

With reference to FIG. 6, the apparatus 6400 for preventing a data read error for OFDM symbol demodulation includes an average time synchronization offset estimating unit 6411, a data buffer control unit 6415, and a radio channel effect compensating unit 6413. The average time synchronization offset estimating unit 6411 estimates average time synchronization offset between a pilot symbol of a time synchronized data frame by the time synchronization compensating unit 6409 and pilot symbols of data frames next to the time synchronized data frame. The data buffer control unit 6415 acquires a start location of a data frame to be read using the estimated average time synchronization offset, and controls reading of written data frames using the acquired start location information of the data frame to be read.

The radio channel effect compensating unit 6413 compensates radio channel effect included in the pilot symbol of the synchronized data frame and the pilot symbols of the succeeding data frames. The radio channel effect indicates that transmission and reception signal data are distorted or lost due to interference and noise in a radio channel environment such as an OFDM communication system. The reason to compensate the radio channel effect is that it causes an error in estimation of time synchronization offset between pilot symbols. In a case of the terrestrial DMB using a phase reference symbol for acquisition of time synchronization, a step of compensating the radio channel effect may be omitted.

The average time synchronization offset estimating unit 6411 estimates average time synchronization offset between a pilot symbol of a synchronized data frame and pilot symbols of data frames next to the time synchronized data frame. The average time synchronization offset may be estimated by Equation 1.

$$\Delta t_F = \frac{N}{2\pi k} \tan^{-1}\left(\frac{Y_{i+F}(k)}{Y_i(k)}\right) \quad \text{[Equation 1]}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F OFDM symbols, which is a k-th frequency component of a Discrete Fourier Transform value, and N is the number of total sample points included in one OFDM symbol. The $$\left(\frac{Y_{i+F}(k)}{Y_i(k)}\right)$$

may be calculated by Equation 2.

$$\left(\frac{Y_{i+F}(k)}{Y_i(k)}\right) = e^{j\frac{2\pi k}{N}\tau(i+F)-\tau(i)} \quad \text{[Equation 2]}$$

where, $\tau(i)$ is a time synchronization offset less than a resolution of an input signal of a receiver remaining after time synchronization, and $\tau(i+F)$ is time synchronization offset of a pilot symbol spaced apart from the synchronized pilot symbol by one frame composed of F OFDM symbols. The average time synchronization offset may be estimated by repeatedly applying a plurality of incoming pilot symbols in the succeeding data frames next to the time synchronized data frame to Equations 1 and 2.

The buffer control unit 6415 acquires a start location of a data frame to be read by the data buffer 6401 using the estimated average time synchronization offset, and controls reading of written data frames using the acquired start location information of the data frame to be read. The reading of the written data frame in the data buffer 6401 may be controlled using a data pointer indicating a start location of the data frame to be read. A digital signal processor (DSP) having a receiving modem manages the data pointer. The data buffer 6401 checks a data read error occurring due to the time synchronization offset through a write point, a read point, and a loop counter, and reads out a data frame using the data pointer with exact start position information of the data frame from the data buffer control unit 6415. Accordingly, the data buffer 6401 reads out exact data in units of frames using the data buffer control unit 6415, thereby enhancing a receiving performance of the receiver. As a result, the data buffer control unit 6415 may compensate the data read error occurring in the data buffer for each frame.

Meanwhile, a reference clock frequency difference calculating unit 6416 calculates a reference clock frequency difference between the transmitter and the receiver using the estimated average time synchronization offset from the average time synchronization offset estimating unit 6411 by Equation 3.

$$\Delta f = f_s \times \frac{\Delta t_F}{L} \qquad \text{[Equation 3]}$$

where, $\Delta f$ is the difference between a transmission reference clock and a reception reference clock, $f_s$ is a reference clock of a transmitter, $\Delta t_F$ is estimated average time synchronization offset, and L is a frame length. The time synchronization offset compensating unit 6417 compensates time synchronization offset using the reference clock difference $\Delta f$ and the estimated average time synchronization offset $\Delta t_F$. That is, the time synchronization offset compensating unit 6417 compensates the time synchronization offset of sample values constituting an OFDM symbol containing real data using the reference clock difference $\Delta f$ and the estimated average time synchronization offset $\Delta t_F$. Further, the time synchronization offset compensating unit 6417 may compensate the time synchronization offset in units of OFDM symbols, OFDM symbol groups, or data frames. Trade-off is achieved between a calculation amount and a performance for compensation of the time synchronization offset. Although the calculation amount is large, each time the time synchronization offset occurs, it may be compensated to increase the performance. So as to reduce the calculation amount, the number of compensations may be maintained to a minimum value within the range satisfying a reference performance. In a case of T-DMB, for example, when time synchronization offset of less than 10 samples occurs for one frame, each time the time synchronization exceeds a sample unit, it may be compensated. In the T-DMB, when time synchronization offset of 10 samples occurs per frame, because one frame contains 76 OFDM symbols, one sample may be compensated every 7.6 OFDM symbols. Accordingly, the time synchronization offset may be compensated in units of symbols, symbol groups, or data frames according to applied systems or performance environments. Namely, the data buffer control unit 6415 receives time synchronization offset information and compensates a start point of a frame in units of frames. The time synchronization offset compensating unit 6417 may compensate time synchronization offset occurring in one frame in units of OFDM symbols or OFDM symbol groups using the average time synchronization offset and the reference clock frequency difference.

Therefore, the apparatus for preventing a data read error for OFDM symbol demodulation in accordance with an embodiment of the present invention estimates the time synchronization offset using the synchronized pilot symbol, and acquires start location information of a data frame to be read using the estimated time synchronization offset, thereby controlling reading of the data frame in the data buffer using the ring buffer construction. This may prevent an erroneous data read error, and compensate for time synchronization offset of samples containing real data in an OFDM symbol using the acquired time synchronization offset to improve a receiving performance of the receiver. Also, quality deterioration of the receiver due to frequency drift caused by aging of a reference clock of a receiver occurring as time goes by, may be compensated, resulting in increase of the reliability of the receiver.

Figure 7:
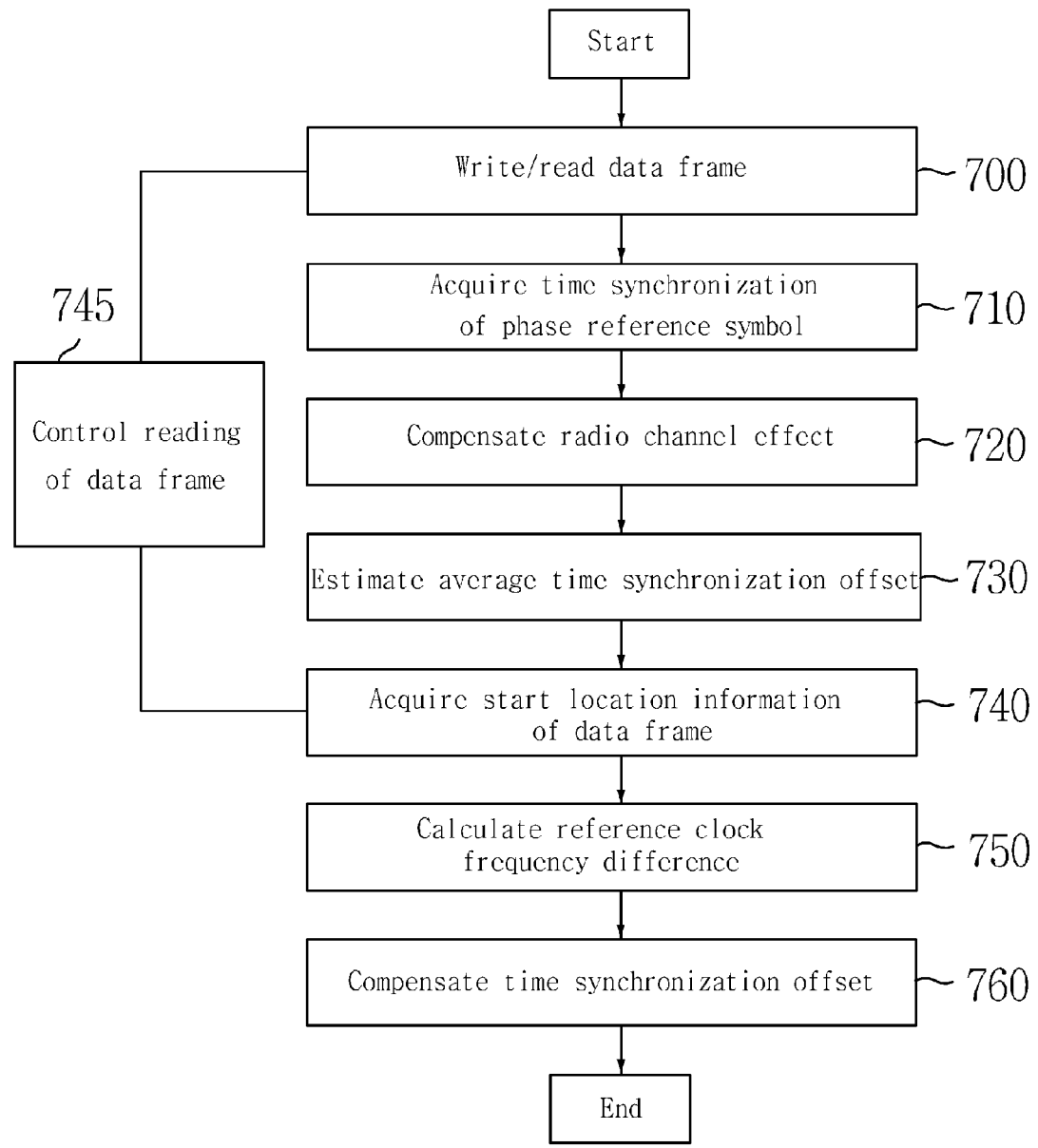
FIG. 7 is a flow chart illustrating a method for preventing a data read error for OFDM symbol demodulation in accordance with an embodiment of the present invention.

FIG. 7 is a flow chart illustrating a method for preventing a data read error for OFDM symbol demodulation in accordance with an embodiment of the present invention.

Referring to FIG. 7 and FIG. 6, accurate time synchronization offset of a pilot symbol included in data (referred to as 'data frame' hereinafter) (step 700) written in units of frames is acquired using the data frame (step 710).

The method for preventing a data read error for OFDM symbol demodulation in accordance with an embodiment of the present invention will be now explained in detail.

The radio channel effect compensating unit 6413 compensates radio channel effect included in the pilot symbol of the synchronized data frame and the pilot symbols of the data frames (step 720). The radio channel effect indicates that transmission and reception signal data are distorted or lost due to interference and noise in a radio channel environment such as an OFDM communication system. The reason to compensate the radio channel effect is that it causes an error in estimation of time synchronization offset between pilot symbols. In a case of the terrestrial DMB using a phase reference symbol for acquisition of time synchronization, a step of compensating the radio channel effect may be omitted.

The average time synchronization offset estimating unit 6411 estimates average time synchronization offset between a pilot symbol of a synchronized data frame in which the radio channel effect is compensated and pilot symbols of succeeding data frames next to the synchronized data frame (step 730). The time synchronization offset may be estimated by Equation 4.

$$\Delta t_F = \frac{N}{2\pi k} \tan^{-1}\left(\frac{Y_{i+F}(k)}{Y_i(k)}\right) \qquad \text{[Equation 4]}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F OFDM symbols, which is a k-th frequency component of a Discrete Fourier Transform value, and N is the number of total sample points included in one OFDM symbol. The $$\left(\frac{Y_{i+F}(k)}{Y_i(k)}\right)$$

may be calculated by Equation 5.

$$\left(\frac{Y_{i+F}(k)}{Y_i(k)}\right) = e^{j\frac{2\pi k}{N}\tau(i+F)-\tau(i)} \qquad \text{[Equation 5]}$$

where, $\tau(i)$ is time synchronization offset less than a resolution of an input signal of a receiver remaining after time synchronization, and $\tau(i+F)$ is time synchronization offset of a pilot symbol spaced apart from the synchronized pilot symbol by one data frame. The average time synchronization offset may be estimated by repeatedly applying a plurality of incoming pilot symbols in succeeding data frames next to the synchronized data frame to Equations 4 and 5.

The buffer control unit 6415 acquires start location information of a data frame to be read by the data buffer 6401 using the estimated average time synchronization offset (step 740), and controls reading of written data frames using the acquired start location information of the data frame to be read (step 745). In this case, the reading of the written data frame in the data buffer 6401 may be preferably controlled using a data pointer indicating a start location of the data frame (step 750). Accordingly, the data buffer 6401 checks a data read error occurring due to the time synchronization offset during writing and reading operation (step 700) of the data frame through a write point, a read point, and a loop counter, and reads out a data frame using the data pointer with exact start position information of the data frame. Accordingly, the data buffer 6401 reads out exact data in units of frames using the data buffer control unit 6415, thereby enhancing a receiving performance of the receiver. As a result, the data buffer control unit 6415 may compensate the data read error occurring in the data buffer for each frame.

Meanwhile, a reference clock frequency difference calculating unit 6416 calculates a reference clock frequency difference between the transmitter and the receiver using the estimated average time synchronization offset in the methods expressed by Equations 4 and 5.

$$\Delta f = f_s \times \frac{\Delta t_F}{L} \quad \text{[Equation 6]}$$

where, $\Delta f$ is the difference between a transmission reference clock and a reception reference clock, $f_s$ is a reference clock of a transmitter, $\Delta t_F$ is estimated average time synchronization offset, and L is a frame length.

Then, the time synchronization offset compensating unit 6417 compensates time synchronization offset using the reference clock difference $\Delta f$ and the estimated average time synchronization offset $\Delta t_F$ (step 760). That is, the time synchronization offset compensating unit 6417 compensates the time synchronization offset of sample values constituting an OFDM symbol containing real data. Further, the time synchronization offset may be compensated in units of OFDM symbols, OFDM symbol groups, or frames. Trade-off is achieved between a calculation amount and a performance for compensation of the time synchronization offset. Although the calculation amount is large, each time the time synchronization offset occurs, it may be compensated to increase the performance. So as to reduce the calculation amount, the number of compensations may be maintained to a minimum value within the range satisfying a reference performance. In a case of T-DMB, for example, when time synchronization offset of less than 10 samples occurs for one frame, each time the time synchronization exceeds a sample unit, it may be compensated. In the T-DMB, when time synchronization offset of 10 samples occurs per frame, because one frame contains 76 OFDM symbols, one sample may be compensated every 7.6 symbols.

Accordingly, the time synchronization offset may be compensated in units of OFDM symbols, OFMD symbol groups, or data frames according to an applied system and performance environment.

Although embodiments in accordance with the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. An apparatus for preventing a data read error for orthogonal frequency division multiplexing (OFDM) symbol demodulation, comprising:

an average time synchronization offset estimating unit estimating average time synchronization offset between a pilot symbol of a time synchronized data frame and pilot symbols of succeeding data frames next to the time synchronized data frame, wherein the time synchronization offset is due to a reference clock frequency difference between a transmitter and a receiver;

a data buffer control unit acquiring a start location of a data frame to be read by a data buffer using the estimated average time synchronization offset, and the data buffer control unit controlling the data buffer's reading of the data frame to be read using the acquired start location information of the data frame to be read, wherein the data buffer control unit controls a data pointer in the data buffer, the data pointer indicating a start location of the data frame to be read by the data buffer; and wherein the average time synchronization offset is estimated by Equation, $$\Delta t_F = \frac{N}{2\pi k} \tan^{-1}\left(\frac{Y_{i+F}(k)}{Y_i(k)}\right) \quad \text{Equation}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F pieces, which is a k-th frequency component of a Discrete Fourier Transform value, and N is the number of total sample points included in one OFDM symbol.

2. The method according to claim 1, wherein the average time synchronization offset is estimated by repeatedly applying a plurality of incoming pilot symbols in the succeeding frames next to the time synchronized data frame to the Equation.

3. A method for preventing a data read error for orthogonal frequency division multiplexing (OFDM) symbol demodulation, comprising:

estimating average time synchronization offset between a pilot symbol of a time synchronized data frame and pilot symbols of data frames next to the time synchronized data frame, wherein the time synchronization offset is due to a reference clock frequency difference between a transmitter and a receiver;

acquiring a start location of a data frame to be read by a data buffer using the estimated average time synchronization offset, and controlling reading of the data frame to be read in a data buffer using the start location information of the data frame to be read, wherein the reading of the data frame to be read is controlled by controlling the position of a data pointer, the data pointer indicating a start location of the data frame to be read; and wherein the average time synchronization offset is estimated by $$\Delta t_F = \frac{N}{2\pi k} \tan^{-1}\left(\frac{Y_{i+F}(k)}{Y_i(k)}\right) \quad \text{Equation}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F OFDM symbols, which is a k-th frequency component of a Discrete Fourier Transform value, and N is the number of total sample points included in one OFDM symbol.

4. The method according to claim 3, wherein the average time synchronization offset is estimated by repeatedly applying a plurality of incoming pilot symbols in the succeeding data frames next to the time synchronized data frame to the Equation.

5. An apparatus for preventing data read error for orthogonal frequency division multiplexing (OFDM) symbol demodulation, comprising:
  an average time synchronization offset estimating unit estimating average time synchronization offset between a pilot symbol of a time synchronized data frame and pilot symbols of succeeding data frames next to the time synchronized data frame; and
  a data buffer control unit acquiring a start location of a data frame to be read using the estimated average time synchronization offset, and controlling reading of written data frames in a data buffer using the acquired start location information of the data frame to be read;
  wherein the average time synchronization offset is estimated by Equation, $$\Delta t_F = \frac{N}{2\pi k}\tan^{-1}\left(\frac{Y_{i+F}(k)}{Y_i(k)}\right) \quad \text{Equation}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F pieces, which is a k-th frequency component of a Discrete Fourier Transform value, and N is the number of total sample points included in one OFDM symbol.

6. The apparatus according to claim 5, further comprising a radio channel effect compensating unit compensating radio channel effect included in the pilot symbol of the first time synchronized data frame and the pilot symbols of the succeeding data frames.

7. The apparatus according to claim 5, further comprising a reference clock frequency difference calculating unit calculating a reference clock frequency difference between a transmitter and a receiver using the estimated average time synchronization offset from the average time synchronization offset estimating unit.

8. The apparatus according to claim 7, further comprising a time synchronization offset compensating unit compensating time synchronization offset of an OFDM symbol using the calculated reference clock difference and the estimated average time synchronization offset.

9. The method according to claim 5, wherein the average time synchronization offset is estimated by repeatedly applying a plurality of incoming pilot symbols in the succeeding frames next to the time synchronized data frame to the Equation.

10. A method for preventing data read error for orthogonal frequency division multiplexing (OFDM) symbol demodulation, comprising:
  estimating average time synchronization offset between a pilot symbol of a time synchronized data frame and pilot symbols of data frames next to the time synchronized data frame; and
  acquiring a start location of a data frame to be read using the estimated average time synchronization offset, and controlling reading of written data frames in a data buffer using the start location information of the data frame to be read;
  wherein the average time synchronization offset is estimated by $$\Delta t_F = \frac{N}{2\pi k}\tan^{-1}\left(\frac{Y_{i+F}(k)}{Y_i(k)}\right) \quad \text{Equation}$$

where, $\Delta t_F$ is average time synchronization offset, $Y_i(k)$ is a k-th frequency component of a Discrete Fourier Transform value of an i-th time synchronized pilot symbol, $Y_{i+F}(k)$ is spaced apart from the i-th time synchronized pilot symbol by F OFDM symbols, which is a k-th frequency component of a Discrete Fourier Transform value, and N is the number of total sample points included in one OFDM symbol.

11. The method according to claim 10, further comprising compensating radio channel effect included in the pilot symbol of the first time synchronized data frame and the pilot symbols of the succeeding data frames before the estimation of average time synchronization offset.

12. The method according to claim 10, further comprising calculating a reference clock frequency difference between a transmitter and a receiver using the estimated average time synchronization offset.

13. The method according to claim 12, further compensating time synchronization offset of an OFDM symbol using the calculated reference clock difference and the estimated average time synchronization offset.

14. The method according to claim 13, wherein the time synchronization offset is compensated in units of OFDM symbols, OFDM symbol groups, or data frames.

15. The method according to claim 10, wherein the average time synchronization offset is estimated by repeatedly applying a plurality of incoming pilot symbols in the succeeding data frames next to the time synchronized data frame to the Equation.

* * * * *